April 29, 1941.    A. K. KAAILAU    2,240,139
AUTOMATIC GASKET PUNCH
Filed Oct. 22, 1940    3 Sheets-Sheet 1
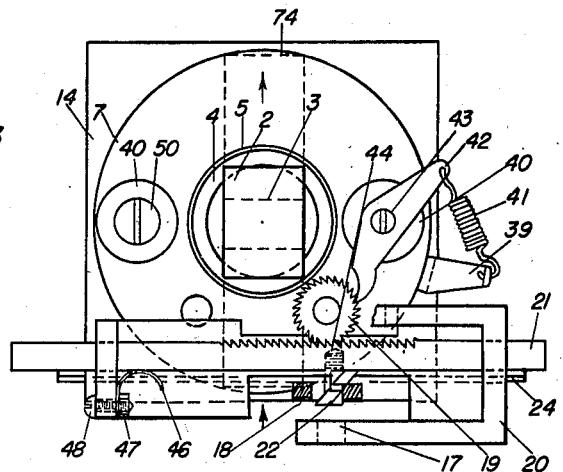
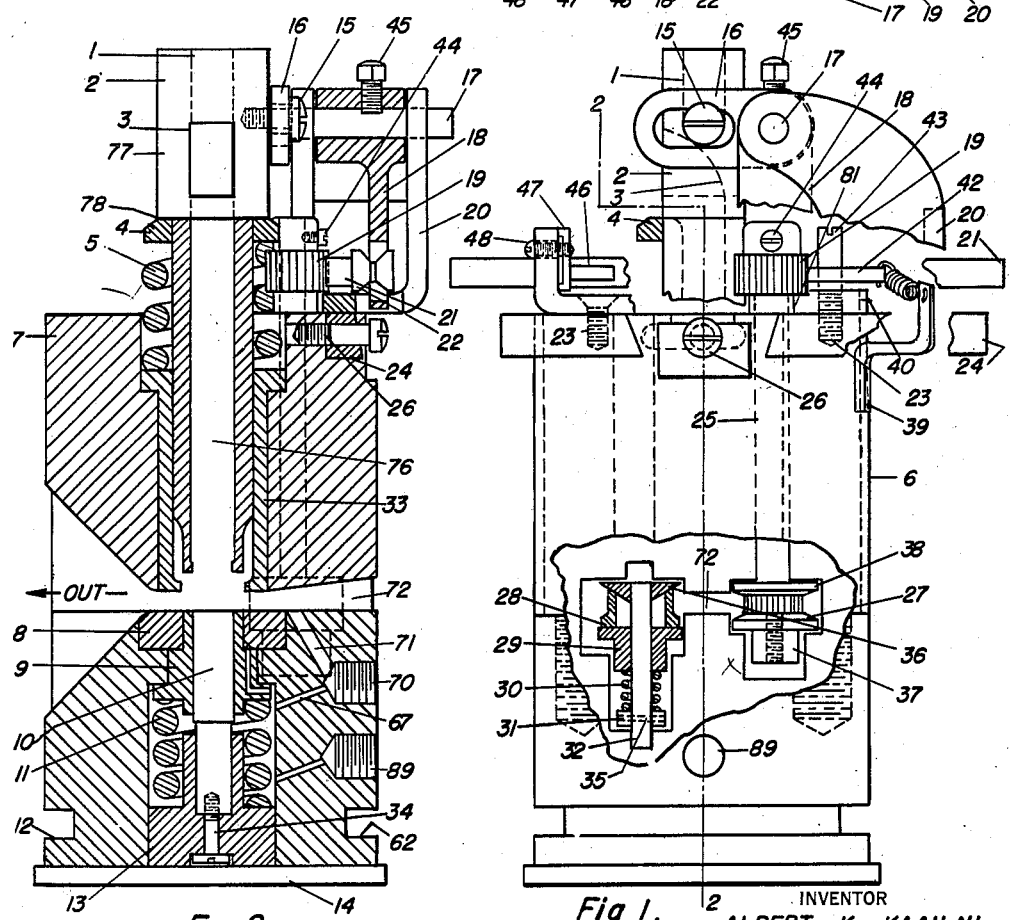
INVENTOR
ALBERT K. KAAILAU
BY
ATTORNEY

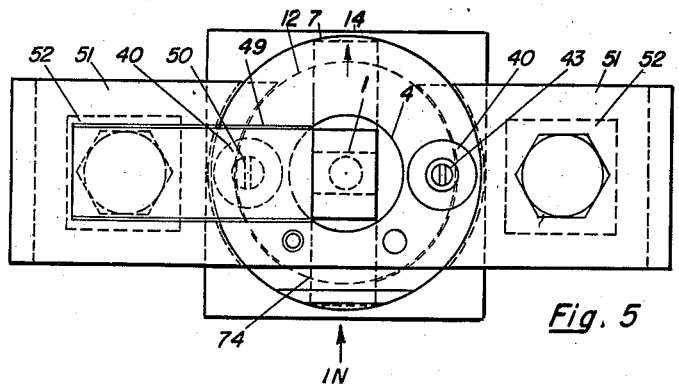
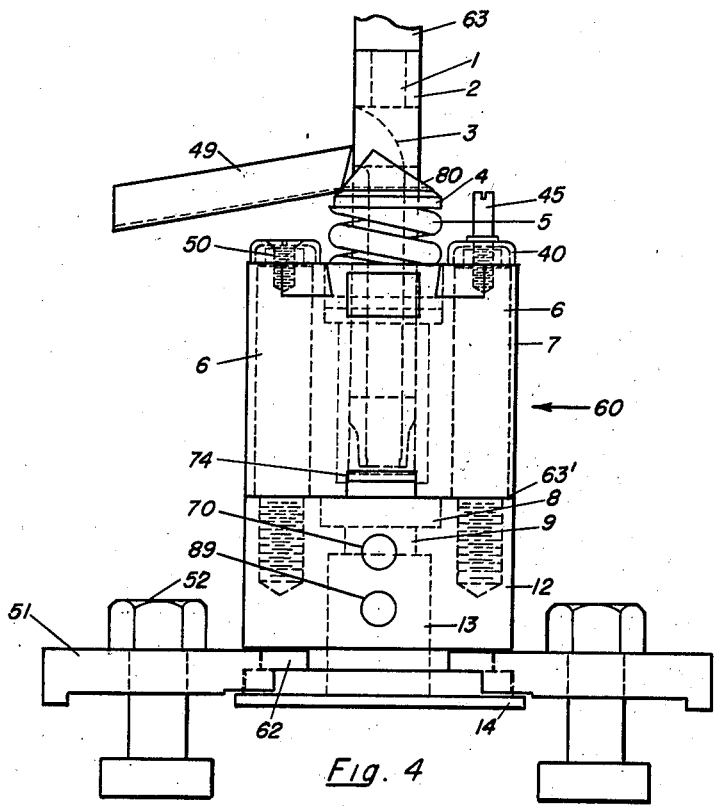

April 29, 1941.  A. K. KAAILAU  2,240,139
AUTOMATIC GASKET PUNCH
Filed Oct. 22, 1940  3 Sheets-Sheet 3
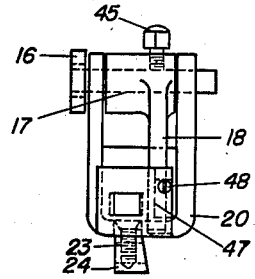
Fig. 8
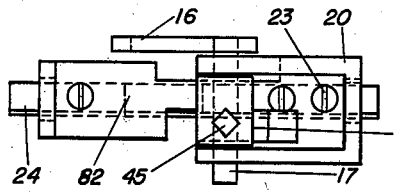
Fig. 7
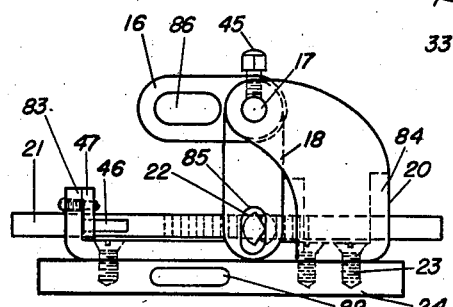
Fig. 6
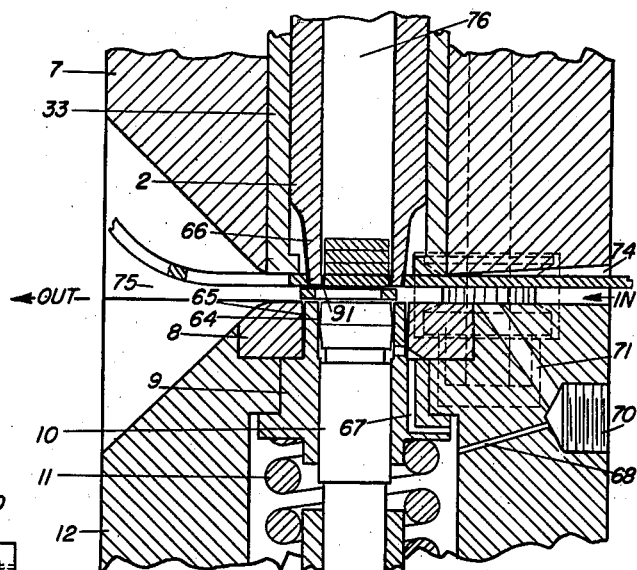
Fig. 10
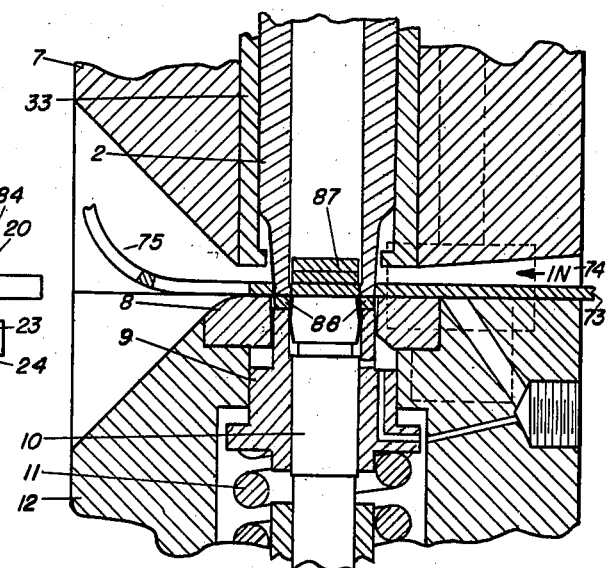
Fig. 9
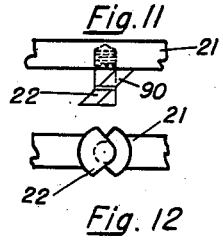
Fig. 11
Fig. 12
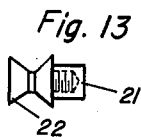
Fig. 13
INVENTOR
ALBERT K. KAAILAU
BY
W. Glenn Jones
ATTORNEY Patented Apr. 29, 1941

2,240,139

UNITED STATES PATENT OFFICE 2,240,139

AUTOMATIC GASKET PUNCH

Albert K. Kaailau, Honolulu, Territory of Hawaii

Application October 22, 1940, Serial No. 362,237

14 Claims. (Cl. 164—89)

(Granted under the act of March 3, 1883, as amended April 30, 1928; 370 O. G. 757)

This invention relates to an automatic gasket punch, and has for an object to provide an improved tool for stamping out gaskets, it being particularly intended for use in making gaskets for burners of oil fired vessels but is equally applicable for making gaskets or washers, either apertured or blank, or for any other purpose. Likewise the tool may be made suitable for making gaskets or washers of any desired size.

A further object of this invention is to provide an automatic gasket punch which can be operated by any power source supplying reciprocating vertical motion and which can be built to punch gaskets or washers of various sizes, one form of this invention having already been built and designed to be operated by a 6 inch vertical shaper of conventional construction. As so designed, the base of this automatic punch is mounted or clamped on the bed of a 6 inch vertical shaper or slotter and the head of the shaper is adjusted to a vertical travel of one-half inch, which is sufficient to operate the tool of this invention. Such vertical shaper can be and has been run at 116 strokes per minute, and allowing for loss of time in inserting blank strips into this tool, it has been found that the production can be kept up indefinitely at the rate of 100 satisfactory gaskets or washers per minute.

With the foregoing and other objects in view, the invention consists in the construction, combination and arrangement of parts hereinafter described and illustrated in the drawings, in which:

Fig. 1 is an elevational view of the automatic gasket punch of this invention, partly broken away;

Fig. 2 is a sectional view on line 2—2 of Fig. 1;

Fig. 3 is a top plan view of Figs. 1 and 2;

Fig. 4 is a view similar to Fig. 1, showing the clamping means for attaching it to the shaper bed with the strip advancing unit power transmitter omitted;

Fig. 5 is a top plan view of Fig. 4;

Fig. 6 is an elevational view of the strip advancing unit power transmitter;

Fig. 7 is a top plan view of Fig. 6, with the ratchet bar omitted;

Fig. 8 is a view looking at the lefthand end of Fig. 7;

Fig. 9 is an enlarged fragmentary sectional view showing the punch as it has just completed its downward stroke;

Fig. 10 is a view similar to Fig. 9, showing the punch partly returned from its downward stroke; and Figs. 11, 12 and 13 are plan view, end view, and side view, respectively, of the ratchet bar tripper.

There is shown at 60 the automatic gasket punch of this invention, which is held on the bed of the shaper or any other suitable base by means of the securing clamps 51 and extending into the clamping down slots 62 of the lower body 12, the securing clamps being attached to the shaper base or bed by means of the clamp bolts 52. The vertical shaper or other reciprocating power device is provided with a depending power bar 63 which comes down against the top of the punch 2.

The automatic gasket punch 60 comprises a lower base or bed 12 to which is attached an upper body 7 by means of dowel pins 6 extending through the upper body 7 and threaded into the lower body or bed 12 as at 63'. Dowel pin caps 40 placed over the dowel pins 6 and held to the dowel pins by means of screws 50 serve to lock the upper body to the bed in proper position, being easily removable if necessary to permit the upper body 7 to be disassembled from the bed for inspection or upkeep.

Extending vertically through the center of the upper body 7 is a counterbored aperture in which is placed a flanged guide bushing 33. Axially aligned with the opening in the upper body is a double counterbored aperture in the tip of which is placed an apertured trimming cutter 8. Extending through this apertured trimming cutter 8 is a vertically reciprocable gasket expeller bushing 9 supported on an expeller bushing spring 11 which, in turn, is supported on a center piece 13 on the supporting plate 14. The center piece 13 also serves as a holder for the center piece punch 10 which is secured in position thereon by the securing screw 34.

It will be noted that the upper end of the punch 10 is provided with a slight taper as at 64 and that there are similar slight tapers at 65 on the upper end of the trimming cutter 8, as well as on the lower end 66 of the punch 2, as more clearly apparent in Figs. 9 and 10, thus providing a clearance about the upper end of the bushing 9. The gasket expeller bushing 9 is provided with a passageway 67 therethrough, the lower end of which axially aligns with the end of a passageway 68 leading from an air inlet opening 70 which may be connected to any suitable source of air pressure. An opening through the bushing 9 permits the air pressure from passageway 67 to keep the upper part of bushing 9 clear of all grit accumulations from working down around the bearing surfaces of bushing 9. A somewhat larger passage 71 serves as a gasket blow-out air passage leading to the top of the lower body 12 and to a passage 72 through which the copper strip 73 passes from the "in" side 74 of this automatic gasket punch to beneath the punch 2 and thence to the "out" side 75. On the "in" side the passage is entirely in the bottom of the upper body 7, while on the "out" side 75 the passage is greatly enlarged and extends into both the upper and lower bodies, as shown in Figs. 2, 9 and 10.

Extending through the guide bushing 33 is the punch 2 which is provided with a center piece escape passage 76, the upper part of this passage being plugged as at 1, and the passage then extends forwardly into a center piece outlet guide 3 for discharging into a center piece escape chute 49.

The punch 2 has a squared head 77, thus forming a shoulder 78 between the squared head 77 and the body of the punch 2. A retractor coil spring 5 supported on the top of the guide bushing 33 supports a spring thrust washer 4 against shoulder 78. An extension 80 from the chute 49 extends about the body of the punch 2 between the thrust washer 4 and the squared head 77 for holding the chute 49 in operative position.

In the preferred form, as herein disclosed, the gaskets are made of copper from a copper strip 73 which is caused to traverse through the "in" and to the "out" passages 74 and 75. In this form the copper strip is a piece of sheet copper 64 mils thick, cut into strips 11/16 of an inch wide and three feet long, and annealed. It is started into the "in" passage 74 until it engages feed wheel 27 and the pressure feed roller 28, which are located on opposite sides of the "in" passage 74. The pressure feed roller 28 is mounted on a roller unit shaft 32 and includes a pressure bushing roller 29 yieldably supported by a spring 30 on the spring lock collar 31 held on the shaft 32 by lock pin 35. This spring 30 causes the pressure bushing roller 29 to press the feed roller 28 against the pressure roller cone 36; it being observed that the feed roller 28 is provided with a conical flange similar in angle to that of the roller cone 36, thereby permitting the feed roller 28 to yieldably press against the strip 37 going through the passage 73. The feed wheel 27 has a serrated or toothed periphery between its flanged edges, the serrations extending in a direction such that when the feed wheel 27 is rotated in a clockwise direction it serves to feed the copper strip 73 through the "in" passage 74. This feed roller 27 is secured between a support washer 38 and a lock nut 37 on a shaft 25 which extends through the upper body 7 to the top face thereof, a ratchet wheel 19 being secured on the shaft 25 so as to rotate the shaft 25, the ratchet wheel 19 being spaced from the surface of the upper body 7 by a collar 31, a lock screw 44 being provided to hold wheel 19 from jumping off the top of the shaft 25.

A strip advancing unit power transmitting mechanism, shown in Figs. 3, 6 and 7, is provided for causing rotation of the shaft 25 and thus of the feed wheel 27 in proper synchronization with the reciprocation of the punch 2. This mechanism includes a ratchet bar 21 having teeth designed to mesh with the ratchet wheel 19. This ratchet bar 21 extends horizontally through the reciprocating unit bracket 20 which, in turn, is secured by bracket supporting screws 23 extending into a spacing attachment and supporting bar 24, this bar 24 being in turn secured in a slot appropriately positioned in the top face of upper body 7, while a feed attachment slot 82 in the supporting bar 24 cooperates with the spacing adjustment lock screw 26 for adjusting and holding the supporting bar 24 in proper position. The ratchet bar 21 extends through apertures in the upturned fingers 83 and 84 of the bracket 20, these apertures being somewhat wider than the width of the ratchet bar 21 so as to permit some lateral movement in addition to the transverse movement of the ratchet bar 21 therethrough. A ratchet bar friction spring 46 tends to urge ratchet bar 21 in the lateral direction for causing the teeth of the ratchet bar 21 to mesh with the teeth of the ratchet wheel 19, this spring 46 being supported on the bracket fingers 83 by the clamp 47 and the clamp screw 48.

Secured to the ratchet bar 21 is a tripper 22 shaped as shown in detail in Figs. 11, 12 and 13. A horizontal reciprocating lever 18 provided with an appropriate slot 85 is secured on the shaft 17 by the set screw 45 while extending from the other end of the shaft 17 is a vertical reciprocating lever 16 having an appropriate slot 86 cooperating with a vertical motion reciprocating screw 15 extending into the side of the squared head 77 of punch 2. To insure that the ratchet wheel 19 can rotate only in a clockwise direction, a pawl 42 is journalled on the cap lock screw 43 and is provided with a pawl spring 41 anchored on a pawl spring holder 39, soldered or otherwise secured to the upper body 7. A lubricating fitting of the conventional type may be secured to lubrication connection 89 for forcing lubrication therethrough into the space about the expeller bushing spring 11.

In operation, the automatic gasket punch is mounted on any vertically reciprocating power unit such as a six inch Pratt & Whitney vertical shaper, being secured to the bed of the shaper by means of the clamp bolts 52 and securing clamps 51 extending into the clamping down slots 62. A power bar 63 is attached to the vertically reciprocating bar of the shaper which has been adjusted for reciprocating vertical movement of about one-half inch. The copper strip 73 is placed into the "in" passage 74 until it passes between the feed roller 28 and the feed wheel 27. The shaper is then started into operation, causing a vertical reciprocation of the punch 2 from the position shown in Fig. 2 to the position shown in Fig. 9. In this downward movement the punch cuts out a gasket 88 against the trimming cutter 8 and leaves a center piece 87 on top of the center piece punch 10 within the passage 76 extending up through the punch 2 to the center piece outlet guide 3. The first center piece 87 to come out is held at the bottom of the punch 2 where the passage 76 is slightly choked as at 91. On the next downward movement of the punch 2 the first center piece is pushed upward by the next formed center piece, and so on until the center pieces are finally ejected through the outlet guide 3 and the chute 49. The gasket 88 meantime is returned by means of the spring 11 and expeller bushing 9 to a horizontal with the bottom of the "in" passage 74. The copper strip 73 is meantime pulled upwardly, due to the taper 66, thereby leaving the gasket 88 free to be expelled by air coming from the air inlet connection 70 through the passage 71.

Further upward movement of the punch 2 beyond the position shown in Fig. 1 removes the punch 2 from within the aperture formed in the strip 73. Then as the punch 2 continues its upward movement, the vertical motion communicating screw 15 within the slot 85 retracts the lever 18 toward the vertical position shown in Fig. 6. As this lever 18 is thus retracted one side of the slot 85 abuts against the bevel 90 of the ratchet bar tripper 22 in a direction to move the ratchet bar 21 into immediate engagement with ratchet wheel 19. Then as the powerful retractor spring 5 continues to move the punch 2 upwardly to its highest position, the ratchet wheel 19 is rotated by the upward movement of the ratchet bar 21, thus causing through its shaft 25 the feed wheel 27 to advance the copper strip 73 a distance through the passage 74 to slightly greater than the diameter of the gasket 88. On the next downward movement the punch in going through this cycle of stamping out the gasket 86, as shown in Fig. 9, moves the lever 16 downwardly and thus moves the lever 18 to the right, as shown in Figs. 1 and 6, thus causing the other side of the slot 85 to contact the bevel on the other side of the tripper 22 and move the ratchet bar 21 first transversely out of mesh with the ratchet wheel 19 before it moves longitudinally as the downward movement of the punch 2 is completed. Upon upward movement of the punch 2 the spring 46 assists the bevel on the first side of tripper 22 in transversely moving the ratchet bar 21 back into mesh with the ratchet wheel 19 for repeating the aforementioned cycle of operation.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. An automatic punch mechanism comprising a punch and a cutter, one being reciprocable toward the other, said punch mechanism having a strip blank passageway extending therethrough between said punch and said cutter when in spaced relation to each other, means on the opposite sides of said passageway for advancing the strip blank through said passageway to be between and beyond said punch and said cutter, and means operated by the reciprocation of said punch and said cutter toward and away from one another operating said strip blank advancing means in proper synchronization with the punching operation, said strip blank advancing means including a feed pressure roller on one side of said passageway and a feed pressure wheel on the other side of said passageway, the periphery of said wheel being serrated.

2. An automatic punch mechanism comprising a punch and a cutter, one being reciprocable toward the other, said punch mechanism having a strip blank passageway extending therethrough between said punch and said cutter when in spaced relation to each other, means on the opposite sides of said passageway for advancing the strip blank through said passageway to be between and beyond said punch and said cutter, means operated by the reciprocation of said punch and said cutter toward and away from one another operating said strip blank advancing means in proper synchronization with the punching operation, said strip blank advancing means including a feed pressure roller on one side of said passageway and a feed pressure wheel on the other side of said passageway, the periphery of said wheel being serrated, said feed pressure roller having angular annular flanges, and yieldable means urging said angular flanges toward one another.

3. An automatic punch mechanism comprising a punch and a cutter, one being reciprocable toward the other, said punch mechanism having a strip blank passageway extending therethrough between said punch and said cutter when in spaced relation to each other, means on the opposite sides of said passageway for advancing the strip blank through said passageway to be between and beyond said punch and cutter, and means operated by the reciprocation of said punch and said cutter toward and away from one another operating said strip blank advancing means in proper synchronization with the punching operation, said strip blank advancing means including a feed pressure roller on one side of said passageway and a feed wheel on the other side of said passageway, the periphery of said wheel being serrated, said feed wheel being angularly flanged.

4. An automatic punch mechanism comprising a punch and a cutter, one being reciprocable toward the other, said punch mechanism having a strip blank passageway extending therethrough between said punch and said cutter when in spaced relation to each other, means on the opposite sides of said passageway for advancing the strip blank through said passageway to be between and beyond said punch and said cutter, means operated by the reciprocation of said punch and said cutter toward and away from one another operating said strip blank advancing means in proper synchronization with the punching operation, and an air pressure conduit extending through said punch mechanism to said strip blank passageway to discharge the punched out object from the mechanism.

5. An automatic gasket punch mechanism for punching out annular gaskets comprising a vertically reciprocating hollow punch having a center blank discharge passageway extending upwardly therethrough, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch.

6. An automatic gasket punch mechanism for punching out annular gaskets comprising a vertically reciprocating hollow punch having a center blank discharge passageway extending upwardly therethrough, yieldable means for imparting upward movement to said hollow punch, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch.

7. An automatic gasket punch mechanism for punching out annular gaskets comprising a vertically reciprocating hollow punch having a center blank discharge passageway extending upwardly therethrough, a blank discharge chute extending from said discharge passageway, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch.

8. An automatic gasket punch mechanism for punching out annular gaskets comprising a vertically reciprocating hollow punch having a center blank discharge passageway extending upwardly therethrough, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch, an annular bushing yieldably supported in the annulus between the center blank punch and said trimming cutter to yield and receive the punched out annular gasket and to then expel the gasket as the reciprocating punch is withdrawn.

9. An automatic gasket punch mechanism for punching out annular gaskets comprising a vertically reciprocating hollow punch having a slightly choked center blank discharge passageway extending upwardly therethrough, a trimming cutter having a slightly tapered internal diameter equal at least to the external diameter of said reciprocable punch, a slightly tapered center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch, an annular bushing yieldably supported in the annulus between the center blank punch and said trimming cutter to yield and receive the punched out annular gasket and to then expel the gasket as the reciprocating punch is withdrawn, said choked discharge passage preventing the center blank from dropping thereout.

10. An automatic gasket punch mechanism for punching out annular gaskets comprising a slightly tapered vertically reciprocating hollow punch having a center blank discharge passageway extending upwardly therethrough, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch, an annular bushing yieldably supported in the annulus between the center blank punch and said trimming cutter to yield and receive the punched out annular gasket and to then expel the gasket as the reciprocating punch is withdrawn, said tapered hollow punch raising the strip blank as the gasket is expelled.

11. An automatic gasket punch mechanism for punching out annular gaskets comprising a vertically reciprocating hollow punch having a center blank passageway extending upwardly therethrough, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch, and means for advancing a strip blank through said passageway to between said reciprocating punch and said trimming cutter and center punch in proper synchronization therewith.

12. An automatic gasket punch mechanism for punching out annular gaskets comprising a vertically reciprocating hollow punch having a center blank discharge passageway extending upwardly therethrough, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch, and means for advancing a strip blank through said passageway to between said reciprocating punch and said trimming cutter and center punch, in proper synchronization therewith, said means comprising a strip blank feed mechanism adjacent said passageway and mechanism connecting said strip blank advancing mechanism to said reciprocating punch to operate said strip blank advancing mechanism during the return of said reciprocating punch from its punching action.

13. An automatic gasket punch mechanism for punching out annular gaskets comprising a vertically reciprocating hollow punch having a center blank passageway extending upwardly therethrough, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch, means for advancing a strip blank through said passageway to between said reciprocating punch and said trimming cutter and center punch, in proper synchronization therewith, said means comprising a strip blank feed mechanism adjacent said passageway and mechanism connecting said strip blank advancing mechanism to said reciprocating punch to operate said strip blank advancing mechanism during the return of said reciprocating punch from its punching action, said mechanism including a serrated feed wheel extending into said strip blank passageway, a shaft on which said feed wheel is mounted, a ratchet wheel mounted on said shaft, a ratchet bar, and means for reciprocating said ratchet bar and meshing said ratchet bar to said ratchet wheel in the strip blank advancing direction only and disengaging said ratchet bar from said ratchet wheel during its reverse motion.

14. An automatic gasket punch mechanism for punching out annular gaskets comprising a vertically reciprocating hollow punch having a center blank discharge passageway extending upwardly therethrough, a trimming cutter having an internal diameter equal at least to the external diameter of said reciprocable punch, a center blank punch concentric with said trimming cutter and having an external diameter not greater than the internal diameter of said hollow reciprocable punch, said punching mechanism having a strip blank passageway extending therethrough between the reciprocable punch and said trimming cutter and said center blank punch, means for advancing a strip blank through said passageway to between said reciprocating punch and said trimming cutter and center punch, in proper synchronization therewith, said means comprising a strip blank feed mechanism adjacent said passageway and mechanism connecting said strip blank advancing mechanism to said reciprocating punch to operate said strip blank advancing mechanism during the return of said reciprocating punch from its punching action, said mechanism including a serrated feed wheel extending into said strip blank passageway, a shaft on which said feed wheel is mounted, a ratchet wheel mounted on said shaft, a ratchet bar, and means for reciprocating said ratchet bar and meshing said ratchet bar to said ratchet wheel in the strip blank advancing direction only and disengaging said ratchet bar from said ratchet wheel during its reverse motion, said means comprising an oppositely beveled ratchet bar tripper, a pivoted slotted lever having a slot extending on opposite sides of said beveled tripper, bracket means slidably supporting said ratchet bar for longitudinal reciprocation and limited transverse motion, the sides of said lever slot contacting the one or the other of the opposite beveled sides of said tripper bar to provide an internal transverse motion of said ratchet bar into or out of mesh with said ratchet wheel, and a pin and slot connection with said lever and the reciprocating punch for actuating said lever by the actuation of said reciprocating punch.

ALBERT K. KAAILAU.